US006938135B1

(12) United States Patent
Kekre et al.

(10) Patent No.: US 6,938,135 B1
(45) Date of Patent: Aug. 30, 2005

(54) INCREMENTAL BACKUP OF A DATA VOLUME

(75) Inventors: Anand A. Kekre, Pune (IN); Angshuman Bezbaruah, Pune (IN); Shailesh Marathe, Pune (IN); Niranjan S. Pendharkar, Pune (IN)

(73) Assignee: Veritas Operating Corporation, Mountain View, CA (US)

( * ) Notice: Subject to any disclaimer, the term of this patent is extended or adjusted under 35 U.S.C. 154(b) by 392 days.

(21) Appl. No.: 10/264,934

(22) Filed: Oct. 4, 2002

(51) Int. Cl.[7] .............................................. G06F 12/00
(52) U.S. Cl. ...................................... 711/162; 711/161
(58) Field of Search ............................... 711/161, 162; 714/5, 6; 707/204

(56) References Cited

U.S. PATENT DOCUMENTS

| | | | |
|---|---|---|---|
| 5,155,824 A | 10/1992 | Edenfield et al. | 395/425 |
| 5,497,483 A | 3/1996 | Beardsley et al. | 395/575 |
| 5,506,580 A | 4/1996 | Whiting et al. | 341/51 |
| 5,532,694 A | 7/1996 | Mayers et al. | 341/67 |
| 5,574,874 A | 11/1996 | Jones et al. | 395/376 |
| 5,649,152 A | 7/1997 | Ohran et al. | 395/441 |
| 5,778,395 A | 7/1998 | Whiting et al. | 707/204 |
| 5,835,953 A | 11/1998 | Ohran | 711/162 |
| 5,907,672 A | 5/1999 | Matze et al. | 395/182.06 |
| 6,073,222 A | 6/2000 | Ohran | 711/162 |
| 6,085,298 A | 7/2000 | Ohran | 711/162 |
| 6,189,079 B1 | 2/2001 | Micka et al. | 711/162 |
| 6,282,610 B1 | 8/2001 | Bergsten | 711/114 |
| 6,341,341 B1 * | 1/2002 | Grummon et al. | 711/162 |
| 6,353,878 B1 | 3/2002 | Dunham | 711/162 |
| 6,434,681 B1 | 8/2002 | Armangau | 711/162 |
| 6,460,054 B1 * | 10/2002 | Grummon | 707/204 |
| 6,591,351 B1 | 7/2003 | Urabe et al. | 711/162 |
| 6,792,518 B2 * | 9/2004 | Armangau et al. | 711/162 |
| 2003/0041220 A1 | 2/2003 | Peleska | 711/162 |

* cited by examiner

*Primary Examiner*—Matthew Kim
*Assistant Examiner*—Woo H. Choi
(74) *Attorney, Agent, or Firm*—Campbell Stephenson Ascolese LLP

(57) ABSTRACT

Disclosed is a method and apparatus for incrementally baking up a data volume. In one embodiment of the method, the data volume is created in a first memory, and a point-in-time (PIT) copy of the data volume is created at time T0. First data of the data volume is modified between times T0 and T1, wherein time T1 is subsequent to time T0. Second data of the data volume is copied to a second memory after time T1. The second data of the data volume is modified after the second data is copied to the second memory. Lastly, data of the PIT copy is overwritten with (1) the copy of the second data stored in the second memory and (2) the modified first data of the data volume.

15 Claims, 5 Drawing Sheets

| n | $V_n$ | $M_n$ |
|---|---|---|
| 1 | 1 | 1 |
| 2 | 1 | 1 |
| 3 | 1 | 0 |
| 4 | 1 | 0 |
| 5 | 1 | 1 |
| 6 | 1 | 0 |
| 7 | 1 | 0 |
| ⋮ | | |
| $n_{max}$ | 1 | 0 |

52

| n | $V_n$ | $M_n$ |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| 7 | 1 | 0 |
| ⋮ | | |
| $n_{max}$ | 1 | 0 |

54

| n | $V_n$ | $M_n$ |
|---|---|---|
| 1 | 0 | 1 |
| 2 | 0 | 0 |
| 3 | 0 | 1 |
| 4 | 0 | 0 |
| 5 | 0 | 1 |
| 6 | 0 | 0 |
| 7 | 0 | 0 |
| ⋮ | | |
| $n_{max}$ | 0 | 0 |

80

| n | $V_n$ | $M_n$ |
|---|---|---|
| 1 | 1 | 0 |
| 2 | 1 | 0 |
| 3 | 0 | 0 |
| 4 | 0 | 0 |
| 5 | 1 | 0 |
| 6 | 0 | 0 |
| 7 | 0 | 0 |
| ⋮ | | |
| $n_{max}$ | 0 | 0 |

INCREMENTAL BACKUP OF A DATA VOLUME

BACKGROUND OF THE INVENTION

Many modern businesses rely on large-scale data processing systems for storing and processing their data. Often, the viability of a business depends on the accuracy of the data volume it stores within its data processing system. Data volumes are often corrupted as a result of human operator error or software problems. Data volume corruption results in storing false data or the deletion of needed data. Businesses must stand ready to correct data volume corruptions. Moreover, businesses that rely heavily on their data processing systems must stand ready to correct data volume corruption in the shortest amount of time possible.

Businesses often store their data in one or more data volumes. A data volume is a collection of files that store data. When an unexpected corruption occurs within a data volume, businesses can restore the data volume to its state just prior to corruption using a previously created backup copy of the data volume. To illustrate, FIG. 1 is a block diagram illustrating the relevant components of an exemplary data processing system 10 having a host node 12, and data storage systems 14 and 16. Data storage systems 14 and 16 include data memories 24 and 26, respectively. The data processing system 10 shown in FIG. 1 and the description thereof should not be considered prior art to the invention described or claimed herein.

Data memories 24 and 26 store data volumes. More particularly, data memory 24 stores a primary data volume while data memory 26 stores a point-in-time (PIT) backup copy of the primary data volume. The primary data volume is the working data volume of data processing system 10, while the PIT backup copy, as its name implies, is a copy of the primary data volume created at a point in time. The PIT backup copy can be used to restore the primary data volume after a corruption thereof, as will be more fully described below.

Host node takes form in a computer system (e.g., the server computer system) that receives and processes requests to read or write data to the primary data volume. The requests are received from client computer systems (not shown) coupled to host node 12. In response to receiving the requests to read or write data, host node 12 generates read or write-data transactions for reading or writing data to one or more addresses within data memory 24. A copy of each request to write data to the primary data volume or a copy of each write-data transaction generated by host node 12, is stored in a write-data transaction log (not shown). The contents of this log are flushed each time host node 12 backs up the primary data volume. Host node 12 backs up the primary data volume by creating an initial PIT backup copy of the primary data volume or by refreshing the PIT backup copy. These processes are more fully described below.

Occasionally, host node 12 unwittingly generates an invalid or erroneous write-data transaction. This write-data transaction corrupts the primary data volume stored in memory 24 by inadvertently deleting data or overwriting good data with false data. When the data corruption is discovered, host node 12 can use the PIT backup copy in data memory 26 and the write-data transactions stored in the write-data transaction log to restore the primary data volume in memory 24 to this state it occupied just before the data corrupting event.

In the restore process, host node 12 applies all write-data transactions held in the write-data transaction log to the PIT backup copy, up to but not including the write-data transaction that caused the data corruption. After host node 12 finishes applying the appropriate logged write-data transactions, the PIT backup copy should be transformed into a copy of the primary data volume at the point in time just before execution of the invalid or erroneous write-data transaction. Host node 12 completes the restore process by synchronizing the corrupted primary data volume in memory 24 with the modified PIT copy in data memory 26. Synchronization includes overwriting each block of data memory 24 with the contents of its corresponding block in data memory 26. After the primary data volume is restored, host node 12 can resume access via read and write-data transactions.

When creating the first PIT backup copy in memory 26, host node 12 copies data from each block of data memory 24 that stores primary data volume data to a respective block of data memory 26 until the entire content of the primary data volume is copied into memory 24. Almost all data copied to data memory 26 can be compressed using a lossless compression algorithm to decrease the time needed to successfully complete the backup operation.

The primary data volume is typically backed up once a day to capture changes to the data line that occurred during the day. In backup operations subsequent to the first, host node 12 could copy the entire contents of the primary data volume to data memory 26 in the block by block copy process described above. Copying the entire contents of the primary data volume to memory 26, however, could be a time-consuming process during which access to the primary data volume is denied other than for the backup operation itself.

Not all blocks in memory 24 that store primary data volume data are changed during the course of the day. As such, the entire content of the primary data volume need not be copied to data memory 26 when performing backup operations subsequent to the first backup operation. In an alternative embodiment, host node 12 performs successive backup operations of the primary data volume by refreshing the previously generated PIT backup copy in memory 26. In this alternative, host node 12 maintains a map that tracks memory blocks in data memory 24 that store primary data volume. Each time a write-data transaction writes data to a memory block in data memory 24, host node 12 sets a bit in the map corresponding to the memory block. In this fashion, host node 12 knows which blocks of data memory 24 have been modified since the last time the primary data volume was backed up. Using this map, host node 12 need only copy to memory 26 those corresponding blocks in memory 24 that contain new or modified data of the primary data volume. This alternative process reduces the time needed to backup the primary data volume. However, host node 12 is still denied access to data memory 24 other than for backing up the contents of the primary data volume. Because host node 12 is denied access to the primary data volume, host node cannot service requests to read or write data received from client computer systems coupled thereto.

SUMMARY OF THE INVENTION

Disclosed is a method and apparatus for incrementally baking up a data volume. In one embodiment of the method, the data volume is created in a first memory, and a point-in-time (PIT) copy of the data volume is created at time T0. First data of the data volume is modified between times T0 and T1, wherein time T1 is subsequent to time T0. Second data of the data volume is copied to a second memory after time T1. The second data of the data volume is modified after the second data is copied to the second memory. Lastly, data of the PIT copy is overwritten with (1) the copy of the second data stored in the second memory and (2) the modified first data of the data volume.

BRIEF DESCRIPTION OF THE DRAWINGS

The present invention may be better understood, and its numerous objects, features, and advantages made apparent to those skilled in the art by referencing the accompanying drawings.

FIG. 6 is a block diagram of VM maps in FIG. 4 and VM maps created by the host node shown in FIG. 2;

The use of the same reference symbols in different drawings indicates similar or identical items.

DETAILED DESCRIPTION

Figure 1:
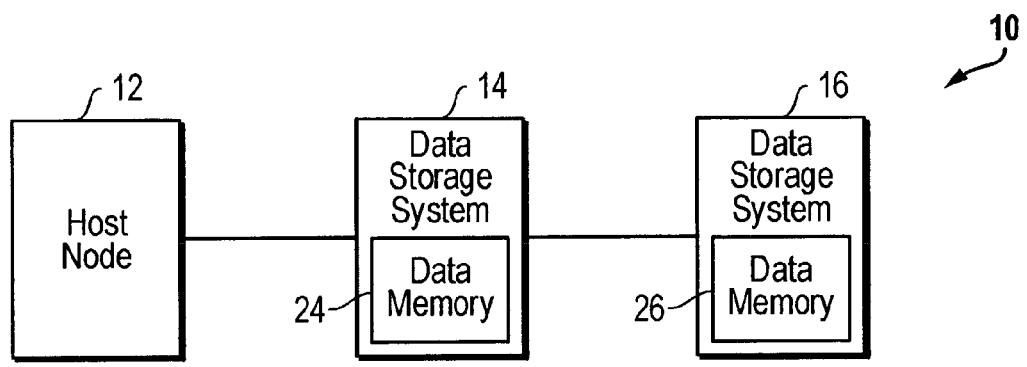
FIG. 1 is a block diagram of a data processing system.
Figure 2:
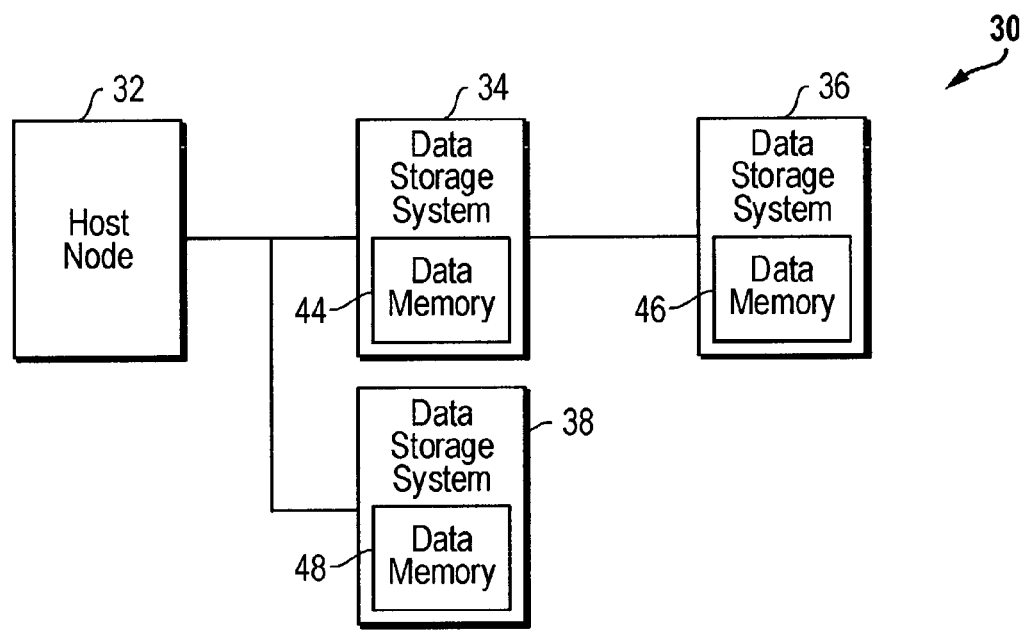
FIG. 2 is a block diagram of a data processing system employing one embodiment of the present invention.

The present invention relates to an apparatus and method for incrementally backing up a data volume. FIG. 2 illustrates (in block diagram form) relevant components of a data processing system 30 deploying one embodiment of the present invention. Data processing system 30 includes a host node 32 coupled to data storage systems 34–38. Data storage systems 34–38 include data memories 44–48, respectively. Host node 32 can store, access and process data stored in each of the data memories 44–48. The definition of the term "coupled devices" should not be limited to two devices coupled directly together. Two devices (e.g., host node 32 and data storage system 34) may be coupled together via a third device (not shown).

Data memory 44 stores the contents of a primary data volume of data processing system 30, while data memory 46 stores a PIT backup copy of the primary data volume. The PIT backup copy may be real or virtual as will be more fully described below. The use of data memory 48 will also be more fully described below.

The primary data volume in memory 44 is the working data volume of data processing system 30, while the PIT backup copy in memory 46 is a copy of the primary data volume created at a point in time. Although the present invention will be described with reference to creating a PIT backup copy in a data storage system (i.e. data storage system 36) separate from the data storage system that stores the primary data volume, it is understood that the present invention should not be limited thereto. For example, the PIT backup copy could be stored within data memory 44 along the primary data volume.

The primary data volume is a collection of files that store data. While it is said that files store data, in reality the data of the primary volume is stored in blocks of data memory 44 allocated to the files by host node 32. Data memories 44–48 may take form in one or more dynamic or static random access memories (RAM), one or more arrays of magnetic or optical data storage disks, or combinations thereof. Data memories 44–48 should not be limited to the foregoing hardware components; rather, data memories 44–48 may take form in any hardware, software, or combination of hardware and software in which data may be accessed and persistently stored. Data memories 44–48 may take form in a complex construction of several hardware components operating under the direction of software. The data memories may take form in mirrored hardware. It is further noted that the present invention may find use with many types of redundancies/reliability systems. For example, the present invention may be used with redundant array of independent disks (RAID) systems. Moreover, the present invention should not be limited to use and connection with the host node of the data storage network. The present invention may find use in a storage switch or in any of many distinct appliances that can be used with a data storage system.

Host node 32 may take form in a computer system (e.g., a server computer system) that receives and processes requests to read or write data to the primary data volume. The requests may be received by host node 32 from client computer systems (not shown) coupled thereto. Host node 32 includes a data storage management system (not shown) that takes in instructions executing in one or more processors within host node 32. The data management system may include a file system (not shown) and a system (not shown) for managing the distribution of the primary data volume across several memory devices of data memory 44 in addition for managing the distribution of data of the PIT backup copy across several memory devices of data memory 46. Volume Manager™ provided by Veritas Software Corporation of Mountain View, Calif., is an exemplary system for managing the distribution of volume data across several memory devices.

Figure 3:
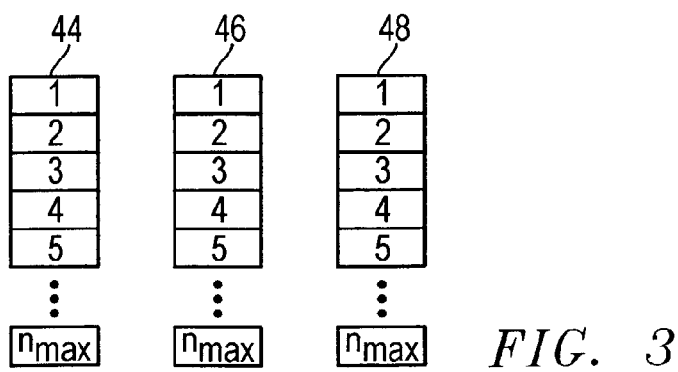
FIG. 3 includes block diagrams illustrating memory structure of data storage systems shown in FIG. 2.

FIG. 3 represents (in block diagram form) a logical structure of data memories 44–48. Each of the data memories 44–48 includes $n_{max}$ memory blocks into which data can be stored. For purposes of explanation, each block of data memory 44 is allocated to and stores data of the primary data volume. Although the blocks of each memory are shown contiguous in FIG. 3, the present invention should not be limited thereto. For example, memory blocks allocated to the primary data volume may be distributed across several memory devices that form data memory 44. Moreover it is noted that any or all of memories 44–48 may have more than $n_{max}$ memory blocks. The first $n_{max}$ blocks of data memories 44 and 46, however, are allocated by host node 32 for storing the primary data volume and the PIT backup thereof, respectively. Corresponding memory blocks in data memories 44–48 are equal in size. Thus, memory block 1 of data memory 44 is equal in size to memory block 1 of data memories 46 and 48. Each of the memory blocks within data memory 44 may be equal in size to each other. Alternatively, the memory blocks in data memory 44 may vary in size.

Host node generates read and write-data transactions, as noted above, in response to receiving and processing requests from client computer system to read and write data to the primary data volume. The read or write-data transactions result in I/O operations to data memory 44. Data storage system 34 (FIG. 2) returns primary volume data to host node 32 in response to receiving a read data transaction therefrom, or data storage system 34 returns an acknowledgement to host node 32 that data has been successfully stored in response to receiving a write-data transaction therefrom.

Host node 32 is capable of creating a virtual PIT backup copy of the primary data volume stored in data memory 44. Creating a virtual copy of a data volume is more fully described in co-pending U.S. patent application Ser. No. 10/143,059 entitled "Method and Apparatus for Creating a Virtual Data Copy," which is incorporated herein by reference. Virtual data volume copies can be instantly created. Once the virtual PIT backup copy is created in memory 46, host node 32 can access either the primary data volume or its virtual PIT backup copy. The virtual PIT backup copy in data memory 46 can eventually be transformed into a real or actual PIT backup copy of the Primary data volume using a background data copying process which will be described below. The primary data volume in data memory 44 (and the virtual PIT backup copy in data memory 46) can be immediately accessed by read and/or write-data transactions generated by host node 32 before the virtual PIT backup copy is transformed into an actual or real PIT backup copy. This concept is more fully described in co-pending U.S. patent application Ser. No. 10/143,059 or in co-pending U.S. patent application Ser. No. 10/254,753 entitled "Method And Apparatus For Restoring a Corrupted Data Volume," filed Sep. 25, 2002, which is incorporated herein by reference in its entirety. The PIT backup copy can be refreshed to assume the new point in time image of the primary data volume. This concept is more fully described in U.S. patent application Ser. No. 10/326,427 entitled "Instant Refresh Operation Of A Data Volume Copy."

Figures 4, 5:
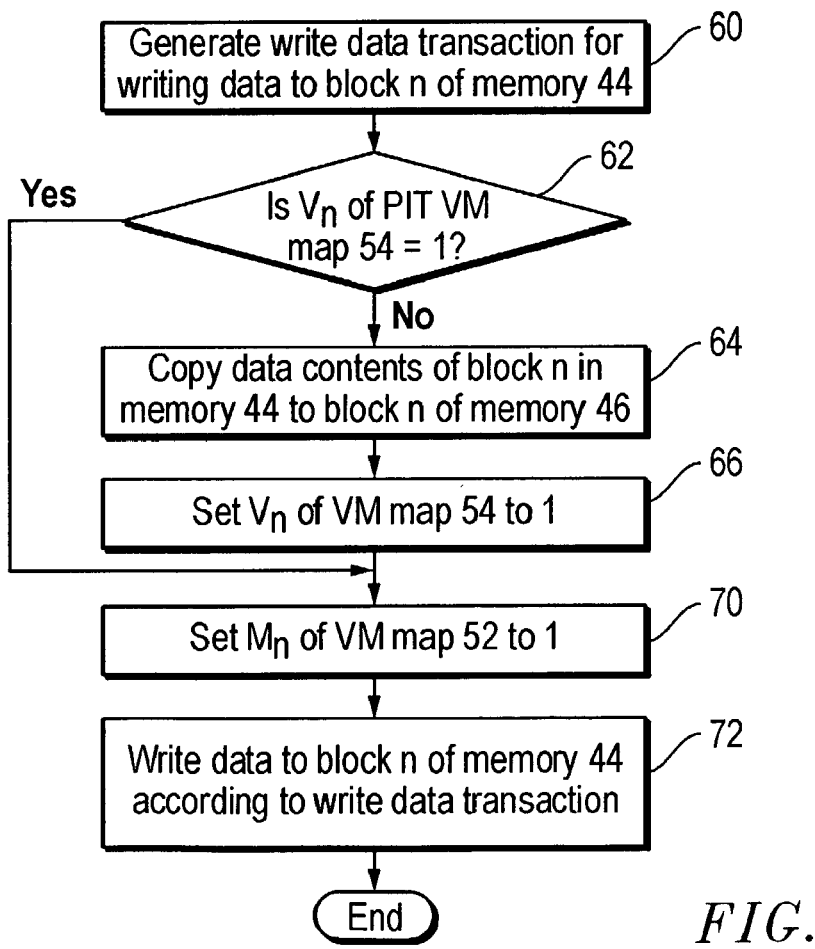
FIG. 4 is a block diagram of VM maps created by the host node shown in FIG. 2.
FIG. 5 is a flow chart illustrating operational aspects of writing or modifying data in the primary data volume of FIG. 2.

In one embodiment, host node 32 creates the virtual PIT backup copy in memory 46 by creating a pair of valid/modified (VM) maps such as VM maps 52 and 54 illustrated in FIG. 4. VM maps 52 and 54 correspond to the primary data volume and the virtual PIT backup copy thereof, respectively. VM maps 52 and 54 can be allocated by host node 32 in memory of host node 32 or elsewhere. VM maps 52 and 54 include $n_{max}$ entries of two bits each in the embodiment shown. Each entry of VM map 52 corresponds to a respective block of data memory 44, while each entry of VM map 54 corresponds to a respective block of data memory 46.

The first and second bits in each entry of VM maps 52 and 54 are designed $V_n$ and $M_n$, respectively. $V_n$ in each entry, depending on its states, indicates whether the corresponding block n of the associated memory contains valid data. For example, when set to logical 1, $V_2$ of VM map 52 indicates that block 2 of data memory 44 contains valid primary volume data, and when set to logical zero $V_2$ of VM map 52 indicates that block 2 of data memory 44 contains no valid primary volume data. It is noted that when $V_n$ is set to logical zero, the corresponding memory block n may contain data, but the data is not considered valid. $V_2$ of VM map 54, when set to logical one, indicates that block 2 of data memory 46 contains a valid copy of data that existed in block 2 of memory 44 at the time the PIT backup copy was first created or at the time the PIT backup copy was last refreshed. $V_2$ of VM map 54, when set to logical zero, indicates that block 2 of data memory 46 does not contain a valid copy of data of the primary data volume.

$M_n$ in each entry, depending upon its date, indicates whether data within the corresponding block n of the associated memory has been modified since some point in time. For example, when set to logical 1, $M_3$ of VM map 52 indicates that block 3 of data memory 44 contains data that was modified via a write-data transaction since the time the PIT backup copy in memory 46 was first created or since the last time the PIT backup copy was refreshed. When set to logical 0, $M_3$ of VM map 52 indicates that data has not been modified in block 3 of memory 44 since the time the PIT backup copy in memory 46 was first created or since the last time the PIT backup copy was refreshed. It is noted that the term data modification of a memory block includes overwriting existing data or adding new data to the memory block. As will be more fully described below, all $M_n$ bits of VM map 52 will be cleared to logical 0 when the PIT backup copy in data memory 46 is refreshed.

When VM map 52 and 54 are first created by host node 32, each entry of map 54 is set to logical 0, thus indicating that the $n_{max}$ blocks of data memory 46 contain no valid or modified data. For purposes of explanation, it is presumed that each of the $n_{max}$ blocks in memory 44 contains valid data of the primary data volume. Accordingly, $V_n$ of each entry map 52 is initially set to logical 1. Lastly, $M_n$ of each entry in VM map 52 is initially set to logical 0. Host node 32 can change the state of each or both bits of the map entry using a single write operation to the memory address that stores the map entry.

Host node 32 creates the virtual PIT backup copy in memory 46. The PIT backup copy in memory 46 is virtual to the extent that the PIT backup copy is less than a full copy of the primary data volume. Host node 32 may run a background data copying process to copy the data contents of data memory 44 to data memory 46 in a block by block manner while host node 32 accesses the primary data volume with read or write-data transactions. Eventually this background process will completely copy the contents of the primary data volume into memory 46, thus transforming the virtual PIT backup copy in data memory 46 into a real PIT backup copy.

FIG. 4 shows that each $V_n$ bit in map 54 is set to logical 1 thus indicating that the entire contents of the primary data volume has been backed up into data memory 46 either through the background copying process itself or by combination of the background copying process and a copy-on-write process more fully described with reference to FIG. 5. The copy on write process described in FIG. 5 is initiated in response to host node 32 receiving a request to write data to the primary volume from a client computer system coupled thereto. This request is received after creation of VM maps 52 and 54. In response to receiving the requests to write data, host node 32 generates a write-data transaction for writing the data to a block n of memory 44, where block n is specified by, for example, the file system executing within host node 32. Host node 32 then accesses VM map 54 to determine whether $V_n$ is set to logical 1 in step 62. If $V_n$ is set to logical 0, then in step 64 host node 32 copies the data contents of block n of memory 44 to block n of memory 46. In step 66, host node 32 sets $V_n$ of VM map 54 to logical one. If $V_n$ of VM map 54 is set to logical 1 in step 62 or after $V_n$ of VM map 54 is set to logical 1, in step 66 host node accesses and sets the $M_n$ bit of VM map 52 to logical 1 as shown in step 70. Thereafter, data is written to block n of memory 44 in accordance with the write-data transaction of step 60. FIG. 4 shows that $M_1$, $M_3$, and $M_5$ are set to logical 1 thus indicating that the contents of blocks 1, 3, and 5, respectively, of memory 44 were the subject of write-data transactions after, for example, initial creation of the virtual PIT copy within data memory 46. Further, it is noted that the contents of blocks 1, 3, and 5 of memory 44 may have been modified before the virtual PIT backup copy was transformed into a real PIT backup copy.

Host node 32 is capable of incrementally backing up the primary data volume one or more times each day in order to capture changes that occurred to the primary data volume during the course of the day. In other words, host node 32 is capable of refreshing the PIT backup copy one or more times each day after a real PIT backup copy has been formed within memory 46. Host node 32, in response to a backup instruction internally generated or received from a source external to host node 32 at time T1, initiates the incremental backup operation by instantly creating a virtual PIT copy of the primary data volume. In creating the virtual PIT copy at T1, host node 32 creates VM maps 80 and 82 shown within FIG. 6 in memory after allocation thereof. VM maps 80 and 82 include $n_{max}$ entries corresponding to $n_{max}$ entries of memories 44 and 48, respectively (see FIG. 3). Each entry of VM map 80 and 82, like VM maps 52 and 54, includes $V_n$ and $M_n$ entries. $V_n$ in VM map 82, depending on its state, indicates whether the corresponding block n of memory 48 contains valid data. For example, when set to logical 1, $V_3$ of VM map 82 indicates that block 3 of memory 48 contains a valid copy of the contents that existed in block 3 in memory 44 at time T1. When set to logical 0, $V_3$ of VM map 82 indicates that block 3 of memory 48 contains no valid copy of the primary data volume stored within memory 44.

Figure 7:
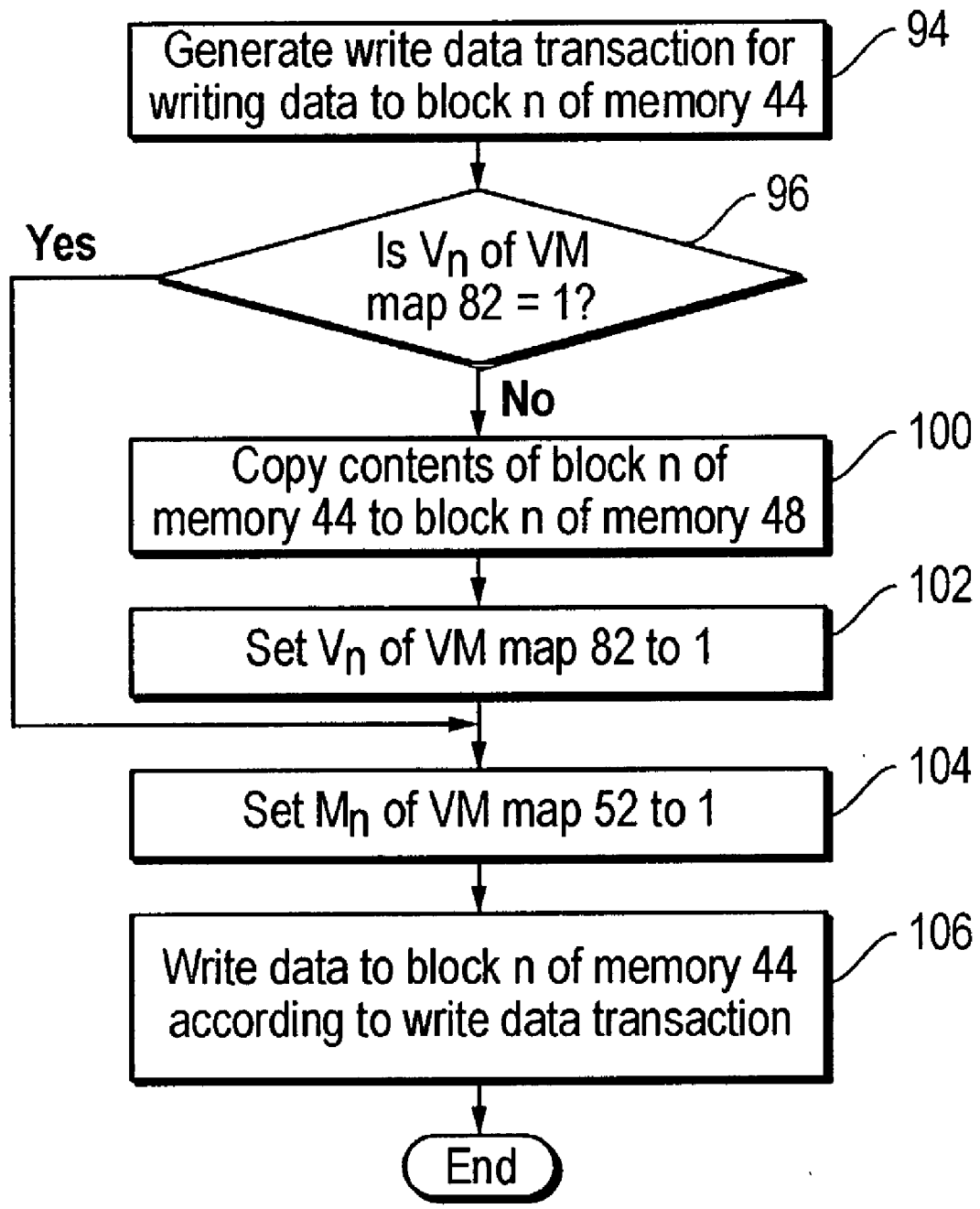
FIG. 7 is a flow chart illustrating operational aspects of writing or modifying data in the primary data volume of FIG. 2.

Initially, each entry of VM maps 80 and 82 is set to logical 0. Shortly after time T1, host node 32 copies the content of VM map 52 into VM map 80. Thereafter, host node clears each $M_n$ bit of map 52. At that point, host node 32 can begin servicing requests to read or write data to the primary data volume. FIG. 7 illustrates operational aspects of servicing a request, received from a client computer system coupled to host node 32, to write data to the primary data volume. More particularly, in step 94, host node 32 generates a write-data transaction for writing data to block n of memory 44. Host node 32 accesses VM map 82 to determine whether $V_n$ is set to logical 1 in step 96. If $V_n$ of VM map 82 is set to logical 0, then in step 100 host node 32 copies the contents of block n of memory 44 to block n of memory 48 as shown in step 100. It is noted that block n of memory 44 may have been modified since the PIT backup copy was created in memory 46. In steps 102 and 104, host node sets $V_n$ and $M_n$ of VM map 82 and VM map 52, respectively, to logical 1. If $V_n$ of VM map 82 is set to logical 1 in step 96 or after $V_n$ of VM map 82 is set to logical 1 in step 102, data is written to block n of memory 44 according to the write-data transaction generated in step 94, as shown in step 106.

Figure 8:
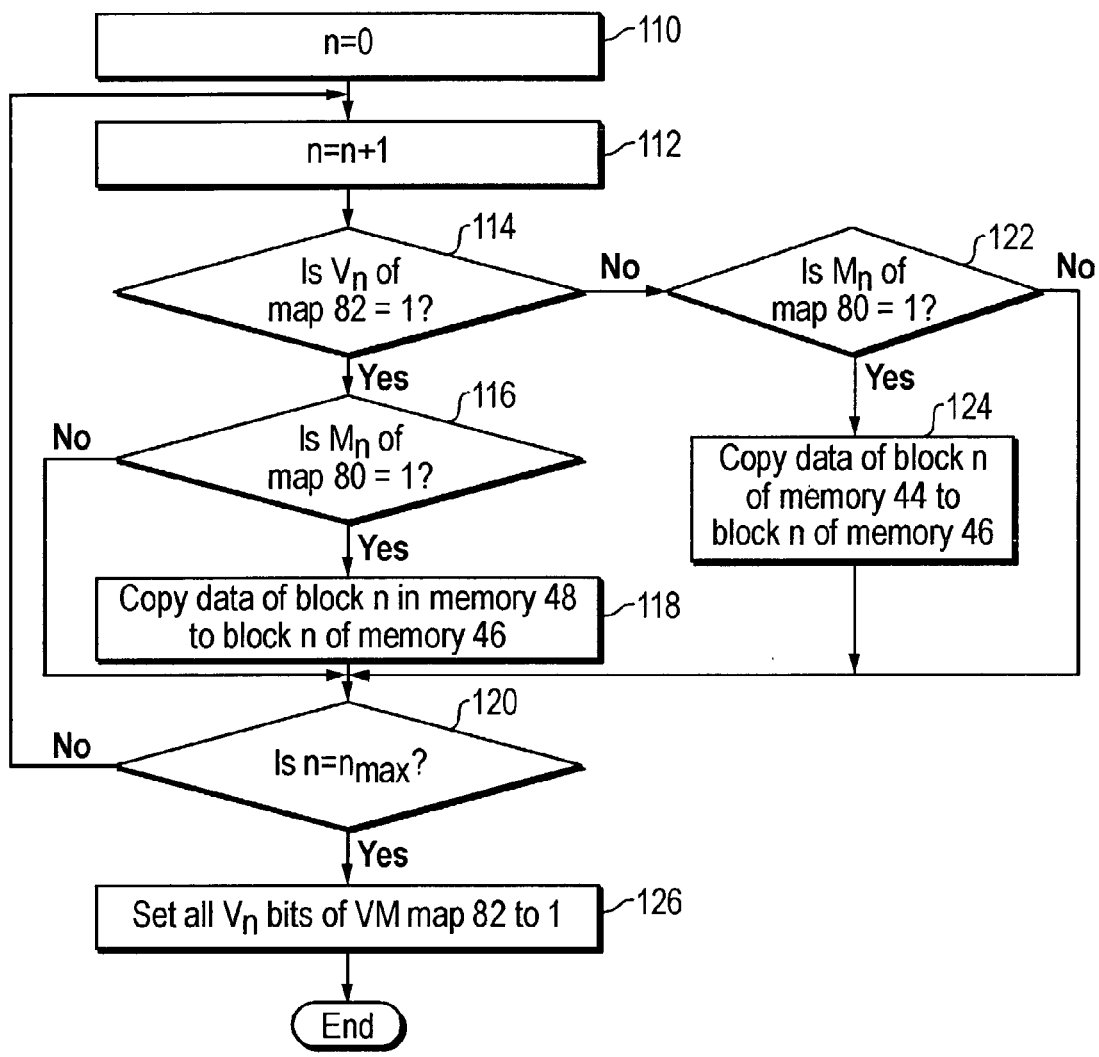
FIG. 8 is a flow chart illustrating operational aspects of incrementally backing up the primary data volume.

Before, during, or after host node 32 services a request write data according to the copy-on-write process described in FIG. 7, host node 32 begins the incremental backup process. FIG. 8 illustrates operational aspects of one embodiment of the incremental backup process. More particularly, in step 110, host node sets variable n to 0. Thereafter, instep 112, host node increments n by 1. In step 114, host node 32 accesses VM map 82 to determine whether $V_n$ is set to logical 1. If $V_n$ of VM map 82 is set to logical 1 then host node 32 determines the state Of $M_n$ in VM map 80 as shown in step 116. If $M_n$ is set to logical 1 in step 116, then host node 32 copies the data contents of block n in memory 48 to block n of memory 46 as shown in step 118. If $M_n$ Of VM map 80 is set to logical 0 in step 120, host node 32 skips step 118.

If, in step 114, $V_n$ of VM map 82 is set to logical 0, host node 32 determines the state Of $M_n$ in VM map 80 as shown in step 122. If $M_n$ is set to logical 1 in step 122, then host node 32 copies the data contents of block n in memory 44 to block n of memory 46 as shown in step 124. If $M_n$ of VM map 80 is set to logical 0 in step 122, host node 32 skips step 124.

After step 116, 118, 122, or 124, host node compares variable n to $n_{max}$ in step 120. If n does not equal $n_{max}$, then the process returns to step 112 where n is incremented by 1. If, however, n equals $n_{max}$ in step 120, then host node 32 sets all $V_n$ bits of VM map 82 to logical 1 as shown in step 126.

Using the copy-on-write process shown in FIG. 7 and the incremental backup process shown in FIG. 8, host node 32 can incrementally back up the primary data volume (or refresh the PIT backup copy) while servicing requests to read or write data to the primary data volume. Once the point in time backup copy in memory 46 has been refreshed, host node 32 can discard VM maps 80 and 82. When the maps 80 and 82 are discarded, the condition in step 96 of FIG. 7 should evaluate to Yes since steps 100 and 102 are no longer required. VM map 52 tracks the changes to the primary data volume subsequent to T1 via the copy-on-write process of FIG. 7 subsequent. As such, the PIT backup copy in memory 46 can be refreshed at a later time T2. At time T2, host node recreates VM maps 80 and 82 with all bits initialized to logical 0, host node copies the contents of VM map 52 to VM map 80, and host node initiates the copy-on-write and incremental backup processes of FIGS. 7 and 8, respectively.

It is noted that in an alternative embodiment, host node 32 can incrementally back up the primary data volume by creating a single VM table having $n_{max}$ entries, each entry having a $V_n$ and $M_n$ bit. In this alternative VM map, each $V_n$ bit corresponds to a respective memory block of memory 48, while each $M_n$ corresponds to a respective memory block of memory 44. Once this alternative VM map is created, host node 32 can set the state of the $M_n$ bits in the alternative VM map to the state of the $M_n$ bits, respectively, of VM map 52. Like the embodiment described above, host node 32 can then clear each of the $M_n$ bits of VM map 52. The copy-on-write process described in FIG. 7 is followed except that step 96 is replaced with the step whereby a host node 32 determines the state of $V_n$ in the alternative VM map as opposed to VM map 82, and in step 102 host node 32 sets $V_n$ of the alternative map to logical 1 rather than setting $V_n$ of the VM map 82. Further, in the incremental backup process described in FIG. 8, $V_n$ of the alternative VM map is checked in step 114 as opposed to $V_n$ of VM map 82, and host node 32 checks the state of $M_n$ of the alternative map in step 116, 122 rather than $M_n$ of VM map 80.

Although the present invention has been described in connection with several embodiments, the invention is not intended to be limited to the embodiments described herein. On the contrary, it is intended to cover such alternatives, modifications, and equivalents as can be reasonably included within the scope of the invention as defined by the appended claims.

We claim:

1. A method of backing up a data volume, the method comprising:
    creating the data volume in a first memory;
    creating a virtual point-in-time (PIT) copy of the data volume at time T0;
    modifying first data of the data volume, wherein the first data is modified between times T0 and T1, wherein time T1 is subsequent to time T0;
    transforming the virtual PIT into a real PIT after modifying the first data of the data volume;
    copying second data of the data volume to a second memory after time T1;

modifying the second data of the data volume after the second data is copied to the second memory;

overwriting data of the real PIT copy with (1) the copy of the second data stored in the second memory and (2) the modified first data of the data volume.

2. The method of claim 1 further comprising modifying third data of the data volume after time T1, wherein the third data is modified before data of the real PIT copy is overwritten with the modified first data and before the PIT copy is overwritten with the copy of the second data stored in the second memory.

3. The method of claim 1 further comprising:

allocating $n_{max}$ first bits in memory, wherein the $n_{max}$ first bits correspond to $n_{max}$ first memory blocks, respectively, of the first memory, wherein each of the $n_{max}$ first memory blocks stores data of the data volume, wherein each of the $n_{max}$ first bits indicates whether the first memory block corresponding thereto contains data that was modified between times T0 and T1;

allocating $n_{max}$ second bits in memory, wherein the $n_{max}$ second bits correspond to the $n_{max}$ first memory blocks, respectively, wherein each of the $n_{max}$ second bits indicates whether data of the first memory block corresponding thereto was copied to the second memory after T1;

overwriting data of the real PIT copy with data of an $n^{th}$ first memory block if (1) the $n^{th}$ first bit corresponding to the $n^{th}$ first memory block is set to indicate that data stored in the $n^{th}$ first memory block was modified between times T0 and T1 and (2) the $n^{th}$ second bit corresponding to the $n^{th}$ first memory block is set to indicate that data in the $n^{th}$ first memory block has not been copied to the second memory after time T1.

4. The method of claim 1 further comprising:

allocating $n_{max}$ first bits in memory, wherein the $n_{max}$ first bits correspond to $n_{max}$ first memory blocks, respectively, of the first memory, wherein each of the $n_{max}$ first memory blocks stores data of the data volume, wherein each of the $n_{max}$ first bits indicates whether the first memory block corresponding thereto contains data that was modified between times T0 and T1;

allocating $n_{max}$ second bits in memory, wherein the $n_{max}$ second bits correspond to $n_{max}$ second memory blocks, respectively, of the second memory, and to the $n_{max}$ first memory blocks, respectively, wherein each of the $n_{max}$ second bits indicates whether data of the first memory block corresponding thereto was copied to the second memory block corresponding thereto after T1;

overwriting data of the real PIT copy with data of an $n^{th}$ second memory block if (1) the $n^{th}$ bit first bit corresponding to the $n^{th}$ first memory block is set to indicate that data stored in the $n^{th}$ first memory block was modified between times T0 and T1 and (2) the $n^{th}$ second bit corresponding to the $n^{th}$ first memory block is set to indicate that data in the $n^{th}$ first memory block has been copied to the $n^{th}$ second memory block after time T1.

5. A computer readable medium comprising instructions executable by a computer system to implement a method, the method comprising:

creating a data volume in a first memory;

creating a virtual copy of the data volume;

modifying first data of the data volume after creating the virtual copy of the data volume;

transforming the virtual copy into a real copy after modifying the first data of the data volume;

refreshing the real copy of the data volume after modifying the first data, wherein refreshing the real copy comprises creating a second virtual copy of the data volume after modification of the first data thereof.

6. The computer readable medium of claim 5 wherein the method further comprises modifying second data of the data volume, wherein the second data is modified before the real copy of the data volume is completely refreshed.

7. A computer readable medium comprising instructions executable by a computer system to implement a method of backing up a data volume, the method comprising:

creating a virtual copy of the data volume, wherein any data of the virtual copy is stored in a second memory, wherein all data of the data volume is stored in a plurality of first memory blocks of a first memory;

modifying data of the data volume between time T0 and subsequent time T1, wherein the virtual data volume copy was created prior to time T0;

transforming the virtual data volume copy into a real data volume copy after modifying the data of the data volume;

creating a first map in memory, wherein the first map comprises a plurality of first bits corresponding to the plurality of first memory blocks, respectively;

switching the state of each of the first bits that correspond to a respective first memory block that stores data that was modified between time T0 and time T1;

modifying data of the data volume after time T1;

creating a second map in memory, wherein the second map comprises a plurality of second bits corresponding to the plurality of first memory blocks, respectively;

switching the state of each of the first bits that correspond to a respective first memory block that stores data that was modified after time T1;

overwriting data of the real data volume copy with data of a block of the first memory if the first but not a second bit corresponding to the block of the first memory, had its state switched.

8. The computer readable medium of claim 7 wherein the method further comprises:

copying data of each first memory block to a respective memory block of a second memory before data in the first memory block is modified after time T1, wherein the data is copied to the set of second memory blocks after time T1;

overwriting data of the real data volume copy with a block of the second memory if the first bit and the second bit corresponding to the block of the first memory, had its state switched.

9. A computer readable medium comprising instructions executable by a computer system to implement a method of backing up a data volume, the method comprising:

creating the data volume in a first memory;

creating a virtual point-in-time (PIT) copy of the data volume at time T0;

modifying first data of the data volume, wherein the first data is modified between times T0 and T1, wherein time T1 is subsequent to time T0;

transforming the virtual PIT into a real PIT after modifying the first data of the data volume;

modifying second data of the data volume after time T1;

copying the second data to a second memory before the second data is modified;

overwriting data of the real PIT copy with (1) the copy of the second data stored in the second memory and (2) the modified first data of the data volume.

10. The computer readable medium of claim 8 wherein the method further comprises modifying third data of the data volume after time T1, wherein the third data is modified before data of the real PIT copy is overwritten with the modified first data and before the real PIT copy is overwritten with the copy of the second data stored in the second memory.

11. The computer readable medium of claim 9 wherein the method further comprises:
   allocating $n_{max}$ first bits in memory, wherein the $n_{max}$ first bits correspond to $n_{max}$ first memory blocks, respectively, of the first memory, wherein each of the $n_{max}$ first memory blocks stores data of the data volume, wherein each of the $n_{max}$ first bits indicates whether the first memory block corresponding thereto contains data that was modified between times T0 and T1;
   allocating $n_{max}$ second bits in memory, wherein the $n_{max}$ second bits correspond to the $n_{max}$ first memory blocks, respectively, wherein each of the $n_{max}$ second bits indicates whether data of the first memory block corresponding thereto was copied to the second memory after T1;
   overwriting data of the real PIT copy with data of an $n^{th}$ first memory block if (1) the $n^{th}$ first bit corresponding to the $n^{th}$ first memory block is set to indicate that data stored in the $n^{th}$ first memory block was modified between times T0 and T1 and (2) the $n^{th}$ second bit corresponding to the $n^{th}$ first memory block is set to indicate that data in the $n^{th}$ first memory block has not been copied to the second memory after time T1.

12. The computer readable medium of claim 9 wherein the method further comprises:
   allocating $n_{max}$ first bits in memory, wherein the $n_{max}$ first bits correspond to $n_{max}$ first memory blocks, respectively, of the first memory, wherein each of the $n_{max}$ first memory blocks stores data of the data volume, wherein each of the $n_{max}$ first bits indicates whether the first memory block corresponding thereto contains data that was modified between times T0 and T1;
   allocating $n_{max}$ second bits in memory, wherein the $n_{max}$ second bits correspond to $n_{max}$ second memory blocks, respectively, of the second memory, and to the $n_{max}$ first memory blocks, respectively, wherein each of the $n_{max}$ second bits indicates whether data of the first memory block corresponding thereto was copied to the second memory block corresponding thereto after T1;
   overwriting data of the real PIT copy with data of an $n^{th}$ second memory block if (1) the $n^{th}$ bit first bit corresponding to the $n^{th}$ first memory block is set to indicate that data stored in the $n^{th}$ first memory block was modified between times T0 and T1 and (2) the $n^{th}$ second bit corresponding to the $n^{th}$ first memory block is set to indicate that data in the $n^{th}$ first memory block has been copied to the $n^{th}$ second memory block after time T1.

13. An apparatus comprising:
   means for creating a data volume in a first memory;
   means for creating virtual a point-in-time (PIT) copy of the data volume at time T0;
   means for modifying data of the data volume, wherein the means for modifying is configured to modify first data of the data volume between times T0 and T1, wherein time T1 is subsequent to time T0, and wherein the means for modifying is configured to modify second data of the data volume after time T1;
   transforming the virtual PIT into a real PIT after modifying the first data of the data volume;
   means for copying the second data to a second memory before the second data is modified;
   means for overwriting data of the real PIT copy with (1) the copy of the second data stored in the second memory and (2) the modified first data of the data volume.

14. A system comprising:
   a first memory;
   a second memory;
   a first device for creating a data volume in the first memory and for creating a virtual point-in-time (PIT) copy of the data volume at time T0;
   a second device for modifying data of the data volume, wherein the second device is configured to modify first data of the data volume between times T0 and T1, wherein time T1 is subsequent to time T0, and wherein the second device is configured to modify second data of the data volume after time T1;
   a device for transforming the virtual PIT into a real PIT after modifying the first data of the data volume;
   a third device for copying the second data to the second memory before the second data is modified;
   a fourth device for overwriting data of the real PIT copy with (1) the copy of the second data stored in the second memory and (2) the modified first data of the data volume.

15. A computer readable medium comprising instructions executable by a computer system to implement a method of backing up a data volume, the method comprising:
   creating the data volume in a first memory;
   creating a point-in-time (PIT) copy of the data volume at time T0;
   modifying first data of the data volume, wherein the first data is modified between times T0 and T1, wherein time T1 is subsequent to time T0;
   modifying second data of the data volume after time T1;
   copying the second data to a second memory before the second data is modified;
   overwriting data of the PIT copy with (1) the copy of the second data stored in the second memory and (2) the modified first data of the data volume;
   allocating $n_{max}$ first bits in memory, wherein the $n_{max}$ first bits correspond to $n_{max}$ first memory blocks, respectively, of the first memory, wherein each of the $n_{max}$ first memory blocks stores data of the data volume, wherein each of the $n_{max}$ first bits indicates whether the first memory block corresponding thereto contains data that was modified between times T0 and T1;
   allocating $n_{max}$ second bits in memory, wherein the $n_{max}$ second bits correspond to $n_{max}$ second memory blocks, respectively, of the second memory, and to the $n_{max}$ first memory blocks, respectively, wherein each of the $n_{max}$ second bits indicates whether data of the first memory block corresponding thereto was copied to the second memory block corresponding thereto after T1;
   overwriting data of the PIT copy with data of an $n^{th}$ second memory block if (1) the $n^{th}$ bit first bit corresponding to the $n^{th}$ first memory block is set to indicate that data stored in the $n^{th}$ first memory block was modified between times T0 and T1 and (2) the $n^{th}$ second bit corresponding to the $n^{th}$ first memory block is set to indicate that data in the $n^{th}$ first memory block has been copied to the $n^{th}$ second memory block after time T1.

* * * * *